350-448
E297A    XR    3,658,419    SR

United States Patent
Simonsson

[15] 3,658,419
[45] Apr. 25, 1972

[54] DEVICE TO FACILITATE THE FOCUSING OF A DISTANCE METER

[72] Inventor: Gunnar Carl Rune Simonsson, Farsta, Sweden

[73] Assignee: Jungner Instrument AB, Stockholm, Sweden

[22] Filed: June 8, 1970

[21] Appl. No.: 44,013

[30] Foreign Application Priority Data
    June 13, 1969 Sweden..................................8477/69

[52] U.S. Cl..................................................................356/3
[51] Int. Cl.............................................................G01c 3/02
[58] Field of Search................350/10, 11, 47; 356/3, 6, 251, 356/252

[56] References Cited

UNITED STATES PATENTS

| | | | |
|---|---|---|---|
| 2,053,196 | 9/1936 | Kitroser | 356/3 |
| 3,010,019 | 11/1961 | Sohst | 356/251 X |
| 2,472,809 | 6/1949 | Decker | 356/251 |
| 3,107,270 | 10/1963 | Hildebrand | 356/251 X |
| 3,151,205 | 9/1964 | Sparer | 350/47 X |

*Primary Examiner*—Ronald L. Wibert
*Assistant Examiner*—F. L. Evans
*Attorney*—Young & Thompson

[57] ABSTRACT

The present invention relates to a device for facilitating the focusing of a distance meter in which the object is accurately imaged by a lens, and the distance sought is determined by measuring the lens-to-image distance. A screen is used to screen the central rays so that only the edge rays are used for imaging. In addition, a luminous mark is placed on the side of a beam and the image of said mark is refracted into the beam by a reflector and projected on the object by the lens. The reflector is a prism which is located in the screened section of the beam, between the imaging lens and the image of the object. This arrangement is suitable for use when the object to be measured is located in a rock chamber, or the like, in which case it is essential that the object be illuminated.

5 Claims, 2 Drawing Figures

PATENTED APR 25 1972

3,658,419

INVENTOR.
GUNNAR CARL RUNE SIMONSSON
BY Young & Thompson
ATTYS.

DEVICE TO FACILITATE THE FOCUSING OF A DISTANCE METER

The present invention relates to a device for facilitating the focusing of a distance meter in which the object is accurately imaged by a lens and the distance sought is determined by measuring the lens-to-image distance, whereby a screen screens the central rays so that only the edge rays are used for the imaging. In addition, a mark is placed on the side of the beam. The image of said mark is refracted, by means of a reflector, into the beam and is projected on the object by the lens. The invention is characterized mainly in that the reflector is located in the screened section by said beam.

The invention is more closely described below in conjunction with the accompanying schematic drawing.

Figure 1:
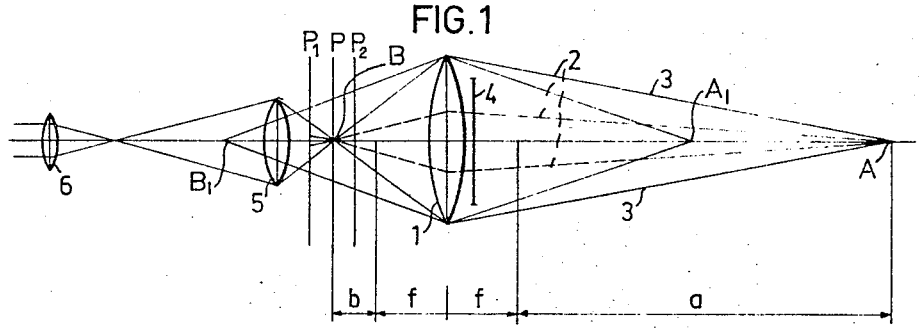
FIG. 1 shows the fundamental optical arrangement.

Reference numeral 1 is a lens having a relatively large focal length, e.g. 2 to 3 dm, and a large diameter, e.g. 1 dm. A point at A is imaged at B; a point $A_1$ is imaged at $B_1$. A central ray of light 2 from e.g. A gives a relatively concentrated, accurate image of the point A even outside the theoretical image plane P, e.g. in the plane $P_1$ and $P_2$. However, the edge rays 3 give, in their planes, an inaccurate image of point A. With the aid of a screen 4, the central rays 2 which give a great depth of field are cut off. The remaining edge rays 3 give an accurate image having a very limited depth of field range. If point B is seen through a fixed magnifying optical system consisting of a lens 5, an eyepiece 6 and hairlines in the plane P, and the lens 1 is made movable along its axis, the distance a to the point A is determined with great accuracy by measuring the lens-to-image distance (i.e. the distance of the image from the lens 1).

According to the lens formula, the following is valid:

$$a \cdot b = f^2; \quad a = \frac{f^2}{b}; \quad b = \frac{f^2}{a}$$

By differentiating the following is obtained:

$$da = \frac{f^2}{b^2} db = \frac{a}{b} db = \frac{a^2}{f^2} db$$

$$db = \frac{b^2}{f^2} da = \frac{b}{a} da = \frac{f^2}{a^2} da$$

For a lens having a focal length $f = 314$ mm. and a diameter $D = 97$ mm, is obtained for e.g. $da = \pm 100$ mm and $a = 20$ m.

$db = \pm 100,000/20,000 \cdot 20,000 \cdot 100 = 0.025$ mm

A distance 0.025 mm can, if produced with the good precision here, be recorded mechanically with satisfactory accuracy.

Attempts made with a lens 1 having a focal length of 200 mm and a diameter of 50 mm have shown that the maximum error at a distance of 10 m is of the magnitude of $\pm 10$ cm. Corresponding db is $\pm 0.04$ mm, and the loss of definition arising in the image plane P corresponds to the first mentioned lens 1 $f = 314$ mm, $D = 97$ mm from a distance of approximately 16 m.

The device according to the invention is suitable for use when the object to be measured is located in a mine or the like in which case it is essential that the object be illuminated. If the filament of a lamp is placed at the point B, as the desired distance is being fixed said filament will simultaneously be projected accurately on the mine face. The position of the point will thus be indicated simultaneously as the required illumination is obtained for the focusing. The projection of the filament can preferably occur in the following manner. A prism is placed in the screened section of the beam and the lamp with a filament is placed at the side of the optical system. The prism then deflects the beam from the filament into the beam of the measuring device.

Figure 2:
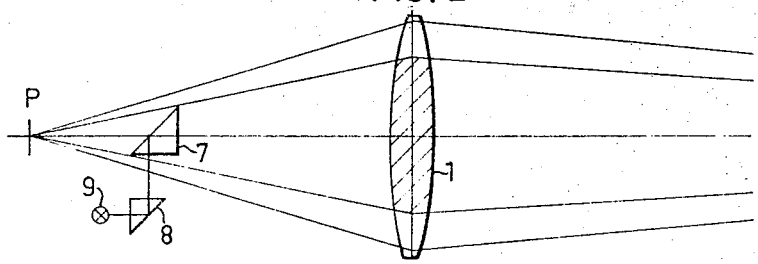
FIG. 2 shows the projection of a luminous impression.

Such an arrangement is shown in FIG. 2. A right-angle prism 7 is put into the beam between the imaging lens 1 and the image plane P. Located outside of the beam is a further right-angle prism 8 which reflects the rays from a lamp placed outside of said prism 8 to the reflecting surface of the prism 7 which in turn reflects the light rays out through the imaging lens 1. Said prism thereby functions as a screen for the central, lined part of the lens 1 which is thus used only for projecting the filament in the lamp 9. The prism 7 thus has a double function of (a) decreasing the depth of field by screening the central part of the lens 1 so that only the edge rays are used for imaging, and (b) for projecting an image of the filament.

What I claim is:

1. In a device for facilitating the focusing of a distance meter, comprising an imaging lens for projecting an image of the object whose distance is to be measured, and means to measure the lens-to-image distance; the improvement comprising means to screen the central rays passing through said imaging lens so that only the edge rays are used for imaging, and means located at one side of the optical axis of the imaging lens for projecting a mark by way of said screening means to the object whose distance is to be measured.

2. A device as claimed in claim 1, said screening means being disposed between said lens and said image.

3. A device as claimed in claim 1, in which said screening means comprises a prism that reflects said mark.

4. A device as claimed in claim 1, said projecting means comprising a light source whereby said mark is luminous.

5. A device as claimed in claim 1, said screening means comprising a prism disposed between said lens and said image, said projecting means comprising a light source directing light to said prism and then by reflection from said prism through said lens and to said object whereby said mark is luminous.

* * * * *